A. H. HANDLAN, Jr.
RAILWAY SIGNAL LAMP.
APPLICATION FILED JUNE 9, 1919.
1,338,769.
Patented May 4, 1920.
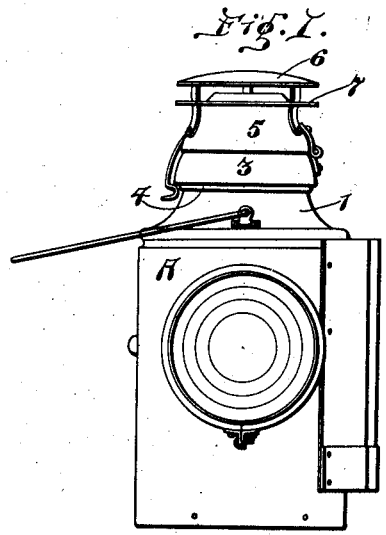
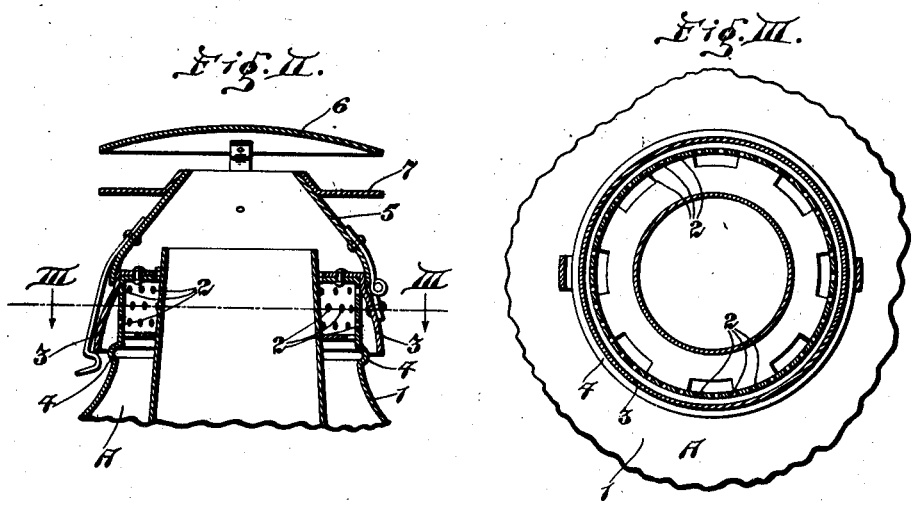

UNITED STATES PATENT OFFICE.

ALEXANDER H. HANDLAN, JR., OF ST. LOUIS, MISSOURI.

RAILWAY SIGNAL-LAMP.

1,338,769.  Specification of Letters Patent.  Patented May 4, 1920.

Application filed June 9, 1919. Serial No. 302,910.

*To all whom it may concern:*

Be it known that I, ALEXANDER H. HANDLAN, Jr., a citizen of the United States of America, and a resident of the city of St. Louis, in the State of Missouri, have invented certain new and useful Improvements in Railway Signal-Lamps, of which the following is a full, clear, and exact description, reference being had to the accompanying drawings, forming a part of this specification.

Railway signal lamps, as constructed at the present time, include top ventilators comprising shells having perforations therein, through which air is admitted to support combustion, and also comprise open vent caps above the perforated shells, the latter being open at their upper ends and being surmounted by hoods which are spaced from the vent caps. In the use of such signal lamps, rain is frequently driven into the ventilators both through the perforations in the shell and through the open upper end of the vent cap, to a sufficient extent to extinguish the flame in the lamp, such entrance of rain usually occurring when the rain is carried against the ventilator by strong or eddying currents of air, and particularly where there is some object or objects adjacent the lamp which tends to deflect a rain carrying air current against the lamp ventilator, such objects being, for example, semaphore arms between which the signal lamp is located. My invention has for its object to provide the ventilator of a railway signal lamp with baffles which serve to effectually prevent the ingress of rain through the portions of the lamp ventilator above mentioned, and which by their presence eliminate the possibility of the flame in the lamp being extinguished by rain.

Figure I is an elevation of a signal lamp having its ventilator constructed in accordance with my invention.

Fig. II is an enlarged vertical section taken through the ventilator of the lamp.

Fig. III is a horizontal section taken on line III—III, Fig. II.

The body A of my lamp may be of any ordinary construction, no invention being herein claimed therefor.

Above the body of the lamp is the main ventilator shell 1 provided with air inlet perforations 2, through which air enters the shell 1 to move downwardly into the lamp for the purpose of supporting combustion. The perforated portion of the ventilator is surrounded by an annular shield 3, which is spaced from said perforated portion and is intended to prevent the passage of air and rain through the perforations 2, but does not perform this function in the presence of air currents which cause the rain to be carried upwardly between the shield and the ventilator shell.

To overcome the upward movement of rain between the shell and the shield when air currents of the kind mentioned exist with the rain, I provide a baffle 4 surrounding the shell 1 adjacent the lower edge of the annular shield 3. This baffle, preferably in the form of a bead produced from the shell 1, may be of any other suitable form, and forms a continuous stop to prevent upward movement of rain in a course which would permit of its passage through the perforations 2 and into the lamp to the detriment of the flame burning therein.

5 designates the usual apertured vent cap, preferably of tapering form, surmounting the ventilator shell, and in turn surmounted by a hood 6. To overcome the tendency of rain to enter the open upper end of this vent cap under certain air conditions, such as strong eddying currents, I provide upon the vent cap a baffle ring 7 which extends outwardly from the vent cap, the ring being preferably horizontally disposed, as shown in the drawings. The baffle ring 7 in its location upon the vent cap overhangs the lower portion of the cap and serves to prevent the rain being blown upwardly therepast when it strikes the vent cap, and consequently the rain is excluded from entrance into the open upper end of said cap. Any rain that strikes the upper surface of the baffle ring is delivered thereto so near the top of the vent cap that it is readily deflected away from the open upper end of the cap or passes thereover without entrance into the ventilator.

I claim:

1. A signal lamp ventilator comprising a perforated shell, a shield surrounding the perforated portion of said shell and a vent cap having an open upper end surmounted on said shell, said shell being provided with a baffle thereon adjacent to said shield, said vent cap having a surrounding baffle ring thereon at its open upper end.

2. A signal lamp ventilator comprising a perforated shell, a shield surrounding said portion of said shell and a vent cap surmounted upon said shell, said shell being provided with a baffle in the form of a raised annular bead thereon adjacent to said shield beneath said perforated portion of said shell, said vent cap having a horizontally disposed baffle ring thereon at its open upper end and overhanging the lower portion of said vent cap.

In testimony that I claim the foregoing I hereunto affix my signature.

ALEXANDER H. HANDLAN, Jr.